No. 765,201. Patented July 19, 1904.

UNITED STATES PATENT OFFICE.

ROBERT E. SCHMIDT, OF ELBERFELD, AND PAUL TUST, OF VOHWINKEL, GERMANY, ASSIGNORS TO FARBENFABRIKEN OF ELBERFELD CO., OF NEW YORK, N. Y., A CORPORATION OF NEW YORK.

PROCESS OF MAKING ANTHRARUFIN.

SPECIFICATION forming part of Letters Patent No. 765,201, dated July 19, 1904.

Application filed December 10, 1903. Serial No. 184,670. (No specimens.)

*To all whom it may concern:*

Be it known that we, ROBERT E. SCHMIDT, doctor of philosophy, chemist, residing at Elberfeld, and PAUL TUST, chemist, residing at Vohwinkel, near Elberfeld, Germany, (assignors to the FARBENFABRIKEN OF ELBERFELD COMPANY, of New York,) have invented a new and useful Improvement in Processes of Making Anthrarufin; and we hereby declare the following to be a clear and exact description of our invention.

Our new process consists in causing alkaline earths—such as slaked lime, baryta water, or the like—to act on 1-5-anthraquinone disulfonic acid. This acid can be obtained according to the process described in the United States Letters Patent No. 742,910, dated November 3, 1903.

In carrying out our new process practically we can proceed as follows, the parts being by weight: In an autoclave provided with a stirrer a mixture of twenty-five parts of the sodium salt of 1-5-anthraquinone disulfonic acid, thirty parts of calcium hydroxid, (Ca[OH]$_2$,) and four hundred parts of water are heated to from 180° to 190° centigrade for about twelve hours while stirring. After cooling the resulting anthrarufin is precipitated from the reaction mass by the addition of hydrochloric acid. It is then isolated by filtration. The process proceeds in an analogous manner if other alkaline earths or if mixtures of these bodies be employed.

Having now described our invention and in what manner the same is to be performed, what we claim as new, and desire to secure by Letters Patent, is—

1. The new process for producing 1-5-dioxyanthraquinone which process consists in first heating an aqueous mixture containing 1-5-anthraquinone disulfonic acid and an alkaline earth, and then separating the resulting 1-5-dioxyanthraquinone from the reaction mass, substantially as hereinbefore described.

2. The new process for producing 1-5-dioxyanthraquinone which process consists in first heating an aqueous mixture containing 1-5-anthraquinone disulfonic acid and a mixture of alkaline earths, and then separating the resulting 1-5-dioxyanthraquinone from the reaction mass, substantially as hereinbefore described.

3. The new process for producing 1-5-dioxyanthraquinone which process consists in first heating a mixture of 1-5-anthraquinone disulfonic acid with calcium hydroxid and water to from 180° to 190° centigrade, secondly acidulating the reaction mass with hydrochloric acid, and finally isolating the resulting 1-5-dioxyanthraquinone from the reaction mixture, substantially as hereinbefore described.

In testimony whereof we have signed our names in the presence of two subscribing witnesses.

ROBERT E. SCHMIDT.
PAUL TUST.

Witnesses:
  OTTO KÖNIG,
  J. A. RITTERSHAUS.